United States Patent
Doi

(10) Patent No.: US 7,334,083 B2
(45) Date of Patent: Feb. 19, 2008

(54) LIBRARY SYSTEM, VIRTUAL LIBRARY APPARATUS, CACHE RESTORING METHOD, AND COMPUTER READABLE RECORDING MEDIUM RECORDED THEREON A CACHE RESTORING PROGRAM

(75) Inventor: Koichi Doi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 352 days.

(21) Appl. No.: 11/055,070

(22) Filed: Feb. 11, 2005

(65) Prior Publication Data

US 2006/0101200 A1    May 11, 2006

(30) Foreign Application Priority Data

Nov. 9, 2004    (JP)    ............... 2004-324915

(51) Int. Cl.
*G06F 12/00* (2006.01)
(52) U.S. Cl. .................. 711/113; 711/133; 711/114
(58) Field of Classification Search .................. None
See application file for complete search history.

(56) References Cited

U.S. PATENT DOCUMENTS 7,082,506 B2 *    7/2006    Nakano et al. ............. 711/162

2005/0120092 A1 *    6/2005    Nakano et al. ............. 709/217

FOREIGN PATENT DOCUMENTS

JP    5-53730    3/1993
JP    11-272426    10/1999

* cited by examiner

*Primary Examiner*—Reginald Bragdon
*Assistant Examiner*—Horace L. Flournoy
(74) *Attorney, Agent, or Firm*—Staas & Halsey LLP

(57) ABSTRACT

In a library system in which a virtual library apparatus is interposed between a library apparatus and a data processing apparatus, a collecting means collects access states to a logical volume from the data processing apparatus, a database retains the access states, and a restoring means determines a restoration priority of the logical volume on the basis of the access state, reads out the logical volume from a physical volume retaining the logical volume onto a cache according to the restoration priority, thereby restoring the logical volume to be held in the cache. Even immediately after the cache of the virtual library apparatus is replaced with another new cache, it is possible to avoid a case where the response speed to a mount request (processing request) from the data processing apparatus becomes slower than the response speed during the normal operation before replacement of the cache.

24 Claims, 10 Drawing Sheets

FIG. 2

| LOGICAL VOLUME NAME | LATEST ACCESS DATE | ACCESS FREQUENCY (A): NUMBER OF TIMES/WEEK | ACCESS FREQUENCY (B): NUMBER OF TIMES/MONTH | PHYSICAL VOLUME NAME | STATUS | CAPACITY (MB) |
|---|---|---|---|---|---|---|
| LV0000 | 2003/1/5 | 10 | 37 | PV0000 | ON Cache | 450 |
| LV0001 | 2003/1/6 | 3 | 13 | PV0000 | Migrated | 790 |
| ... | ... | ... | ... | ... | ... | ... |

56,59

LIBRARY SYSTEM, VIRTUAL LIBRARY APPARATUS, CACHE RESTORING METHOD, AND COMPUTER READABLE RECORDING MEDIUM RECORDED THEREON A CACHE RESTORING PROGRAM

BACKGROUND OF THE INVENTION

1) Field of the Invention

The present invention relates to a library system in which a virtual library apparatus is interposed between a library apparatus and a data processing apparatus. Particularly, the present invention relates to a technique for restoring contents of a cache which is provided in the virtual library apparatus, and holds data read out from a physical volume in the library apparatus as a logical volume in order that the data processing apparatus has an access to the data to process the same.

2) Description of the Related Art

FIG. 9 is a schematic diagram showing a structure of a known library system 100. The library system 100 shown in FIG. 9 comprises a library apparatus 20 and a data processing apparatus (host) 30.

The library apparatus 20 comprises an accommodating shelf 22 accommodating a plurality (here, 64) of recording media (for example, magnetic tapes, magneto-optic disks, optical disks) 21, a plurality (here, six) of drive units 23 for processing the recording media 21, and a transporting mechanism (accessor) 24 for transporting the recording media 21 between the accommodating shelf 22 and the drive units 23.

The data processing apparatus 30 processes data recorded on the recording media 21 in the library apparatus 20. The data processing apparatus 30 controls the transporting mechanism 24 to transport a recording medium 21 from the accommodating shelf 22 to the drive unit 23, and controls a processing unit of the drive unit 23 to perform a process (Read/Write) on the recording medium 21. When the process is completed, the data processing apparatus 30 controls the transporting mechanism 24 to transport the recording medium 21 from the drive unit 23 to the accommodating shelf 22.

With improvement of the technique, the recording capacity of the recording medium 21 is increased, and the processing performance (Read/Write performance and the like) of the drive unit 23 is improved, in these years.

In the library system 100 shown in FIG. 9, the data processing apparatus 30 using the recording media 21 and the drive units 23 is fabricated on the assumption that conventional recording media having small capacity and drive units having low processing performance are used in order to keep the compatibility with conventional software resources/hardware resources. Thus, the data processing apparatus 30 cannot sufficiently use performances of recent recording media having large capacity and drive units having high processing performance.

To cope with this drawback, there has been proposed a library system in which a virtual library apparatus configuring virtual recording media and virtual drive units is interposed between the data processing apparatus and the library apparatus, its substance (that is, the library apparatus) is configured with the latest recording media and drive units, and the data processing apparatus has an access similar to an access to a conventional recording medium and drive unit, thereby accessing to the latest recording media and drive unit (refer to Patent Document 1 below, for example).

FIG. 10 is a schematic diagram showing a structure of a library system 100' having a known virtual library apparatus 40. In FIG. 10, like reference characters designate like or corresponding parts in FIG. 9, detailed descriptions of which are thus omitted. As shown in FIG. 10, the library system 100' has a virtual library apparatus 40 between the library apparatus 20 and the data processing apparatus 30, along with the library apparatus 20 and the data processing apparatus 30. The virtual library apparatus 40 has a logical layer (front end) 41, a physical layer (back end) 42, a control unit 43 and a cache 44.

The logical layer 41 controls the inputs/outputs to/from the data processing apparatus 30. The logical layer 41 emulates the conventional recording media, drive units and transporting mechanism assumed by the data processing apparatus 30. In FIG. 10, the drive units and the transporting mechanism emulated by the logical layer 41 are denoted by a reference character 45. Hereinafter, the drive unit configured by emulating by the logical layer 41 will be referred to as a logical drive.

When the data processing apparatus 30 has an access, the physical layer 42 reads out data to be accessed from a recording medium (hereinafter referred to as a physical volume) 21 using a drive unit (hereinafter referred to as a physical drive) 23 of the library apparatus 20. When the data processing apparatus 30 completes (unloads) the process, the physical layer 42 records the user data (logical volume) undergone the process (Read/Write) by the data processing apparatus 30 on the physical volume 21 using a physical drive 23.

The control unit 43 controls the logical layer 41 and the physical layer 42.

The cache 44 holds, as a logical volume, data read out from a physical volume 21 by the physical layer 42 in order that the data processing apparatus 30 processes the data. Even when the logical volume is recorded on the physical volume 21 by the physical layer 42 after the process by the data processing apparatus 30, the cache 44 keeps holding the logical volume as it is.

When a capacity of a new logical volume cannot be secured on the cache 44 in response to a request to mount the new logical volume from the data processing apparatus 30, the oldest logical volumes on the cache 44 are deleted in the order of the capacity until the necessary capacity is secured.

The cache 44 is comprised of, for example, a RAID (Redundant Arrays of Inexpensive Disk).

When the data processing apparatus 30 makes a request to mount a logical volume in the library system 100', a process (1) or (2) below is performed:

(1) Confirming whether or not a logical volume requested by the data processing apparatus 30 is present on the cache 44. When the logical volume is present on the cache 44, "READY" is immediately reported on a designated logical drive.

(2) Confirming whether or not a logical volume requested by the data processing apparatus 30 is present on the cache 44. When the logical volume is not present on the cache 44, confirming whether or not there is a free capacity sufficient to load the logical volume into the cache 44. When the free capacity is not sufficient, deleting the oldest logical volume on the cache 44 to secure the free capacity. The control unit 43 controls the physical layer 42, whereby the physical layer 42 mounts a physical volume 21 retaining the logical volume requested by the data processing apparatus 30 onto a physical drive 23, reads the logical volume, loads the logical volume into the cache 44, and reports of "READY" on the designated logical drive.

In the library system 100', when a logical volume requested by the data processing apparatus 30 is present on the cache 44 [that is, when the process (1) is performed], it is possible to immediately (within one second) make the "READY" response in response to the mount request from the data processing apparatus 30.

When the logical volume requested by the data processing apparatus 30 is not present on the cache 44 [that is, the above process (2) is performed], it is necessary to read out the logical volume from the physical volume 21. For this, there is a case where the "READY" response cannot be immediately made in response to the mount request from the data processing apparatus 30, and it takes one minute or more to make the "READY" response. In the library system 100', a logical volume frequently accessed from the data processing apparatus 30 is mostly present on the cache 44, thus it is rare that the logical volume has to be read out from the physical volume 21.

In the library system 100' shown in FIG. 10, when the cache 44 is replaced with a new cache due to, for example, a fault or a change in the capacity, there is no case where data to be held is deleted because logical volumes held in the cache 44 are also held in the physical volumes 21.

However, immediately after the cache 44 is replaced with another new cache, it is necessary to read a requested logical volume from the physical volume 21 onto the new cache each time the data processing apparatus 30 makes a request to mount the logical volume. For this, the response to the data processing apparatus 30 is noticeably degraded, and the response speed to the processing request from the data processing apparatus 30 is decreased as compared with before the replacement of the cache.

[Patent Document 1] Japanese Unexamined Patent Application Publication No. HEI 11-272426

SUMMARY OF THE INVENTION

In the light of the above problem, an object of the present invention is to certainly avoid a case where the response speed to a mount request from the data processing apparatus becomes slower than the response speed during the normal operation before the cache is replaced, even immediately after the cache in the virtual library apparatus is replaced with another new cache.

To attain the above object, the present invention provides a library system comprising a library apparatus storing therein a recording medium as a physical volume, and having a drive unit for accessing to the physical volume, a data processing apparatus processing data recorded on the physical volume in the library apparatus, and a virtual library apparatus interposed between the library apparatus and the data processing apparatus, the virtual library apparatus comprising a cache holding data read out from the physical volume as a logical volume in order that the data processing apparatus has an access to the data to process the data, a logical drive accessing to the logical volume held in the cache according to an instruction from the data processing apparatus, and a physical layer recording data recorded on the aid logical volume by the logical drive on a physical volume retaining the logical volume asynchronously with an access to the logical volume by the logical drive, the library system comprising a collecting means for collecting an access state to the logical volume from the data processing apparatus, a database for retaining the access state collected by the collecting means, and a restoring means determining a restoration priority of the logical volume on the basis of the access state retained in the database, reading out the logical volume from a physical volume retaining the logical volume onto the cache according to the restoration priority, thereby restoring the logical volume to be held in the cache.

It is preferable that the collecting means collects access frequency to each of logical volumes from the data processing apparatus as the access state, and retains the access frequency in the database, and the restoring means determines the restoration priority on the basis of the access frequency retained in the database.

Further, it is preferable that the collecting means collects two or more kinds of access frequency having different periods of time as the access frequency, and retains the two or more kinds of access frequency in the database, and the restoring means determines the restoration priority on the basis of the two or more kinds of access frequency retained in the database.

To attain the above object, the present invention further provides a virtual library apparatus interposed between a library apparatus storing therein a recording medium as a physical volume and having a drive unit for accessing to the physical volume and a data processing apparatus processing data recorded on the physical volume in the library apparatus, the virtual library apparatus comprising a cache holding data read out from the physical volume as a logical volume in order that the data processing apparatus has an access to the data to process the data, a logical drive accessing to the logical volume held in the cache according to an instruction from the data processing apparatus, and a physical layer recording data recorded on the logical volume by the logical drive on a physical volume retaining the logical volume asynchronously with an access to the logical volume by the logical drive, the virtual library apparatus comprising a collecting means for collecting an access state to the logical volume from the data processing apparatus, a database for retaining the access state collected by the collecting means, and a restoring means determining a restoration priority of the logical volume on the basis of the access state retained in the database, reading out the logical volume from a physical volume retaining the logical volume onto the cache according to the restoration priority, thereby restoring the logical volume to be held in the cache.

To attain the above object, the present invention still further provides a cache restoring method used in a virtual library apparatus interposed between a library apparatus storing therein a recording medium as a physical volume and having a drive unit for accessing to the physical volume and a data processing apparatus processing data recorded on the physical volume in the library apparatus, the virtual library apparatus comprising a cache holding data read out from the physical volume in the library apparatus as a logical volume in order that the data processing apparatus has an access to the data to process the data, a logical drive accessing to the logical volume held in the cache according to an instruction from the data processing apparatus, and a physical layer recording data recorded on the logical volume by the logical drive on a physical volume retaining the logical volume asynchronously with an access to the logical volume by the logical drive, the method for restoring contents of the cache comprising a collecting and retaining step of collecting an access state to the logical volume from the data processing apparatus, and retaining the access state in a database, and a restoring step of determining a restoration priority of the logical volume on the basis of the access state retained in the database, reading out the logical volume from a physical volume retaining the logical volume onto the cache according to the restoration priority, thereby restoring the logical volume to be held in the cache.

According to this invention, the restoration priority of each logical volume to be restored on the cache is determined on the basis of collected access states, and the logical volume is restored according to the restoration priority. Thus, even when the cache is replaced with another new cache due to, for example, a fault or a change in capacity, it is possible to avoid a situation where the response speed to a processing request from the data processing apparatus occurring immediately after the replacement of the cache becomes slower than the response speed during the normal operation before the replacement of the cache.

Since the access frequency is collected as the access state and the restoration priority is determined on the basis of the access frequency, a logical volume having high possibility to be used is certainly restored onto the cache. It is thus possible to certainly avoid a situation where the response speed becomes slower rather than a case where the logical volumes held in the cache before replaced are simply restored on the new cache, and certainly keep the response speed during the normal operation before the replacement of the cache.

Since the restoration priority is determined on the basis of two or more kinds of access frequency, it is possible to select more certainly a logical volume to be restored on the cache on the basis of the access frequency. It is thereby possible to certain avoid a situation where the response speed to a process request from the data processing apparatus becomes slower than the response speed during the normal operation before the cache is replaced, even immediately after the cache is replaced.

BRIEF DESCRIPTION OF THE DRAWINGS

FIG. 2 is a diagram for illustrating a part of structures of databases provided in a control unit and a cache in a virtual library apparatus of the library system according to the embodiment of this invention;

DESCRIPTION OF THE PREFERRED EMBODIMENTS

Hereinafter, description will be made of an embodiment of the present invention with reference to the drawings.

[1] Description of Embodiment

Figure 1:
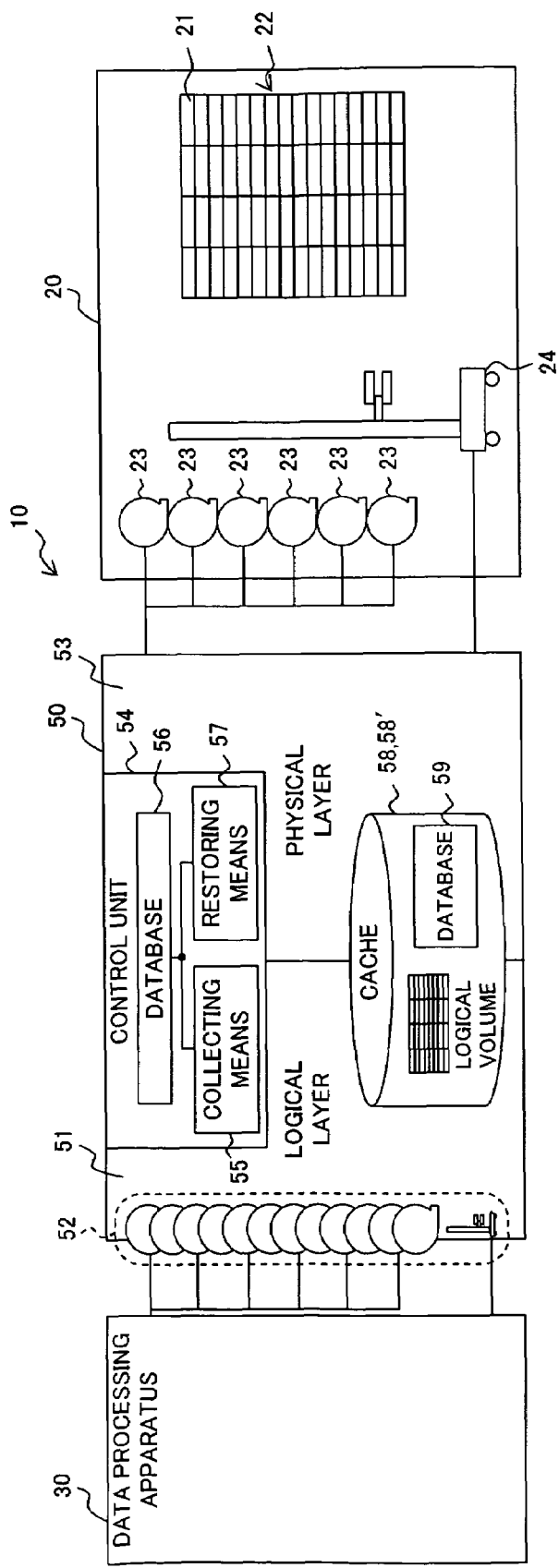
FIG. 1 is a schematic diagram showing a structure of a library system according to an embodiment of this invention.

First, description will be made of a library system according to an embodiment of this invention. FIG. 1 is a schematic diagram showing a structure of a library system 10 according to the embodiment of this invention. In FIG. 1, like reference characters designate like or corresponding parts described above, detailed description of which are thus omitted.

As shown in FIG. 1, the library system 10 according to this embodiment comprises a library apparatus 20, a data processing apparatus (host) 30 and a virtual library apparatus 50.

Figure 10:
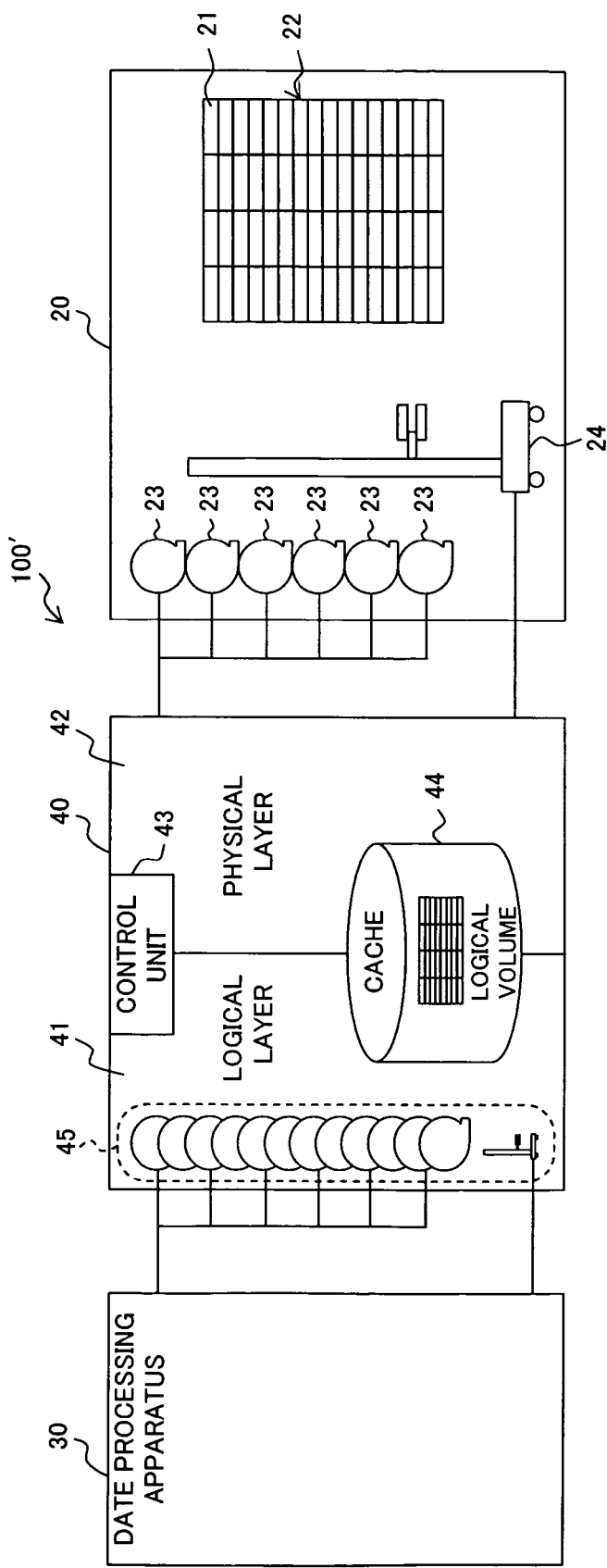
FIG. 10 is a schematic diagram showing a structure of a library system having a known virtual library apparatus.

The library apparatus 20 and the data processing apparatus 30 are similar to the known library apparatus 20 and data processing apparatus 30 described above with reference to FIG. 10. The library apparatus 20 comprises a plurality (here, 64) of recording media 21 as physical volumes, and a plurality (here, six) of drive units (hereinafter referred to as physical drives) 23 for having accesses (Read/Write) to the recording media (hereinafter, referred to as physical volumes) 21.

The virtual library apparatus 50 comprises a logical layer 51, a physical layer 53, a control unit 54 and a cache 58.

The logical layer 51 controls inputs/outputs to/from the data processing apparatus 30. The logical layer 51 emulates the known recording media and drive units that the data processing unit 30 assumes. In FIG. 1, virtual drive units and transporting mechanism (hereinafter, referred to as a logical drive) are denoted by a reference character 52. The logical drive 52 has an access to a logical volume held in the cache 58 to be described later according to an instruction from the data processing apparatus 30.

The physical layer 53 reads out data to be accessed from a physical volume 21, using the physical drive 23 of the library apparatus 20, on the basis of an access from the data processing apparatus 30. When the data processing apparatus 30 completes the process (unloads), the physical layer 53 retains (records) the data undergone the process (here, write process) by the data processing apparatus 30 in a physical volume 21, using the physical drive 23. Incidentally, the data retaining process by the physical layer 53 is executed asynchronously with an access to the data from the logical drive 52.

Namely, the physical layer 53 records data recorded on a logical volume by the logical drive 52 on a physical volume 21 retaining the logical volume asynchronously with an access to the logical volume by the logical drive 52 on the basis of a process request from the data processing apparatus 30.

The control unit 54 controls the logical layer 51 and the physical layer 53. The control unit 54 comprises a collecting means 55, a database 56 and a restoring means 57. Incidentally, the collecting means 55, the database 56 and the restoring means 57 will be described later in detail.

The cache 58 holds data, which has been read out from a physical volume 21 by the physical layer 53 in order that the data processing apparatus 30 accesses to that data to process the same, as a logical volume. The logical volume read out from the physical volume 21 is undergone a process by the logical drive 52 according to a request from the data processing apparatus 30, then held in the physical volume 21 by the physical layer 53. The logical volume undergone the process according to a request from the data processing apparatus 30 is held as it is in the cache 58, as well.

When receiving a request to mount a new logical volume from the data processing apparatus 30, the cache 58 deletes the oldest logical volumes on the cache 58 in the order of the capacity until the necessary capacity is secured if the capacity of the new logical volume cannot be secured on the cache 58.

Figure 3:
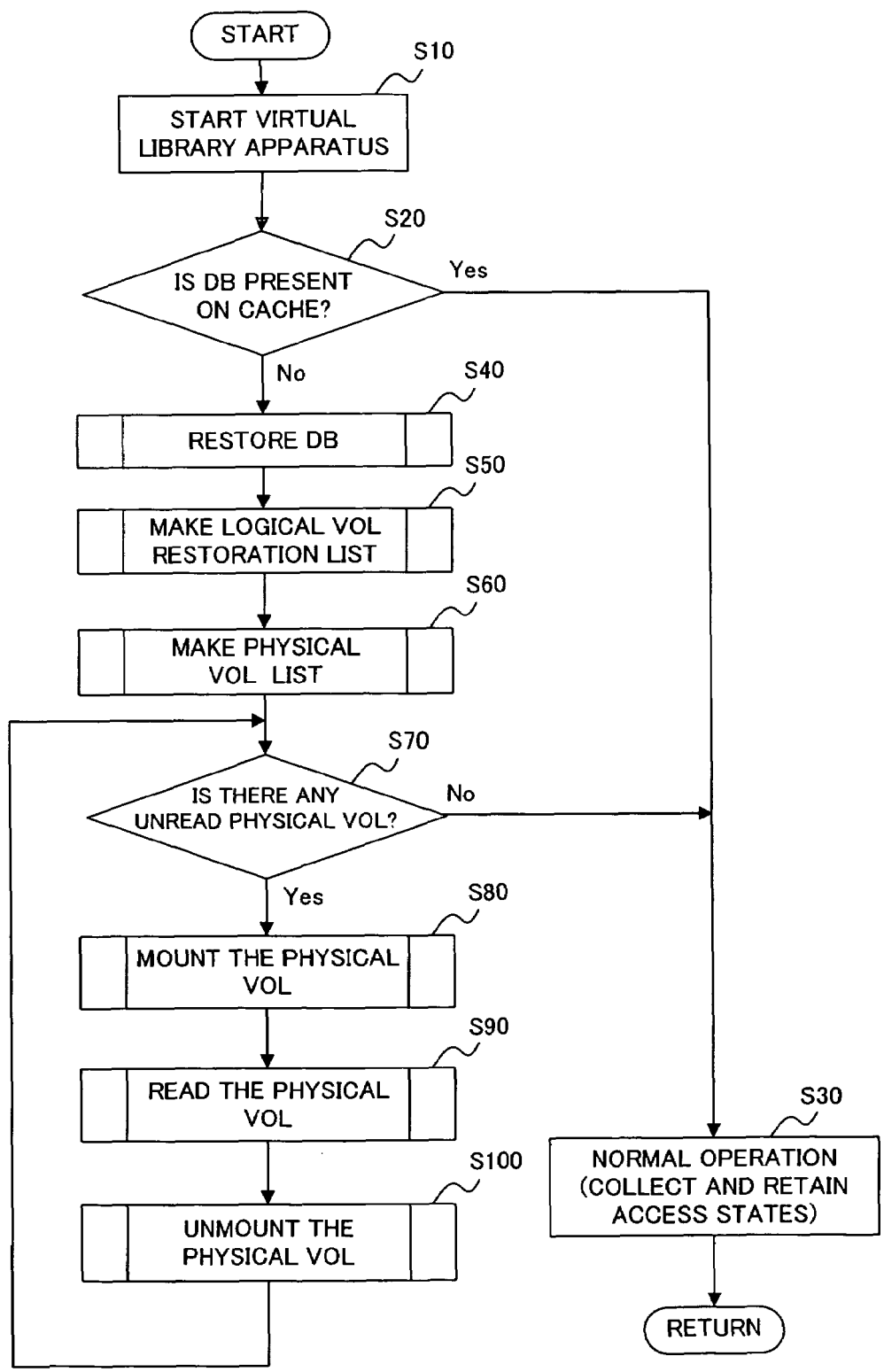
FIG. 3 is a flowchart for illustrating a procedure of a cache restoring method according to the embodiment of this invention.

The cache 58 has a database 59 similar in structure to the database 56 of the control unit 54. The database 59 holds information showing at which position (the block number or the like of a physical volume 21) on which physical volume 21 each of all logical volumes is located, and information relating to access states as shown in FIG. 3 to be described later.

It is preferable that the cache 58 is comprised of a RAID (Redundant Arrays of Inexpensive Disk).

Here, the collecting means 55, the database 56 and the restoring means 57 of the control unit 54 will be described.

The collecting means 55 collects access states to each of the logical volumes from the data processing apparatus 30. The collecting means 55 collects the following items (a) through (e) below as the access states.

(a) The number of times of access to each logical volume within the past one week (access frequency).

(b) The number of times of access to each logical volume within the past one month (access frequency).

(c) The latest access date to each logical volume (the latest access date).

(d) Status information showing a state where each logical volume is present on the cache 58 (On Cache), or a state where data is present on only the physical volume 21 and has been deleted in the cache 58 (Migrated).

(e) The capacity of each logical volume.

These access states (a) through (e) are updated when the process on the logical volume by the data processing apparatus 30 is terminated (when the data processing apparatus 30 issues "Unload").

FIG. 2 is a diagram for illustrating a part of the structures of the database 56 of the control unit 54 and the database 59 of the cache 58. As shown in FIG. 2, the databases 56 and 59 retain access states [the access states (a) through (e)] of each of the logical volumes collected by the collecting means 55, and retain the name of each volume used when the data processing apparatus 30 accesses, and the name of a physical volume 21 in which the logical volume is retained. In FIG. 2, the above access state (a) is inscribed as "access frequency (A)", whereas the above access state (b) is inscribed as "access frequency (B)."

Although not shown in FIG. 2, the databases 56 and 59 also retain information showing at which position on which physical volume 21 each of all logical volumes is located. Such information is obtained by reading out the position on a physical volume 21 of data as being a logical volume by the physical drive 23 with respect to all the physical volumes 21.

Data in the database 56 of the control unit 54 and data in the database 59 of the cache 58 are always synchronized to be in the same state by the mirroring function realized by, for example, an application program.

When the cache 58 is replaced with another cache 58' (hereinafter, a newly replaced cache is denoted by a reference numeral 58'; when a cache originally used and a newly replaced cache are not specifically discriminated, the cache is denoted by a reference numeral 58) due to a fault of the cache 58 or in order to change the capacity of the cache 58, the restoring means 57 determines the restoration priority of a logical volume on the basis of access states retained in the database 56 or the database 59. According to this restoration priority, the restoring means 57 reads out the logical volume from a physical volume 21 onto the newly replaced cache 58', thereby restoring the logical volume to be held in the cache 58' of the virtual library 50.

Next, description will be made of a cache restoring method (operation of the library system 10, specifically, the virtual library apparatus 50 configured as shown in FIG. 1) according to the embodiment of this invention. FIG. 3 is a flowchart (steps S1 through S100) for illustrating a procedure of the cache restoring method according to the embodiment of this invention. As shown in FIG. 3, in the cache restoring method according to the embodiment of this invention, when the virtual library apparatus 50 is started (step S10), the control unit 54 determines whether the database 59 is present on the cache 58 or not (step S20).

When the database 59 is present on the cache 58 (Yes route at step S20), the virtual library apparatus 50 proceeds to the normal operation (step S30). In the normal operation, the collecting means 55 collects access states [the above items (a) through (e)] to a logical volume from the data processing apparatus 30, and retains the collected information in the databases 56 and 59 when the process on the logical volume by the data processing apparatus 30 is completed (collecting and retaining step).

When the database 59 is not present on the cache 58 (No route at step S20), the restoring means 57 determines that the cache 58 is replaced with a new cache 58' that is different from the cache 58 used at the time of the last start, and restores the database 59 on the cache 58' by duplicating (mirroring) the database 56 of the control unit 54 (step S40).

The restoring means 57 then determines the restoration priorities of logical volumes to be held on the cache 58' on the basis of information (refer to FIG. 2) about the access states in the database 56 or the database 59 (here, the database 59), according to the procedure for showing in FIG. 4 through FIG. 8 described later, selects logical volumes to be restored according to the restoration priorities, and makes a list (logical volume restoration list) (step S50).

The restoring means 57 makes a list of physical volumes 21 at which the logical volumes to be restored on the basis of the list of logical volumes to be restored (step S60), and restores the logical volumes to be restored.

Namely, the restoring means 57 determines whether or not there is any physical volume not yet read in the physical volume list made at the above step S60 (step S70). When there is no unread physical volume 21 (No route at step S70), the restoring means 57 determines that all logical volumes to be restored are restored, and the procedure proceeds to the normal operation (step S30).

When there is any unread physical volume 21 (Yes route at step S70), the restoring means 57 controls the physical layer 53 to mount the unread physical volume 21 onto the physical drive 23 (step S80), reads the logical volume to be restored among the physical volumes 21 onto the cache 58' (step S90), and unmounts the physical volume 21 from the physical drive 23 (step S100).

The restoring means 57 repeats the above steps S70 to S100 until there is no unread physical volume 21 (namely, until No is determined at step S70).

The above steps S50 to S100 function as a restoring step, at which the restoration priority of the logical volume is determined on the basis of the access states retained in the database 59, the logical volume is read out from a physical volume 21 retaining the logical volume onto the cache 58' according to the restoration priority, and the logical volume to be retained in the cache 58' is restored.

Figure 4:
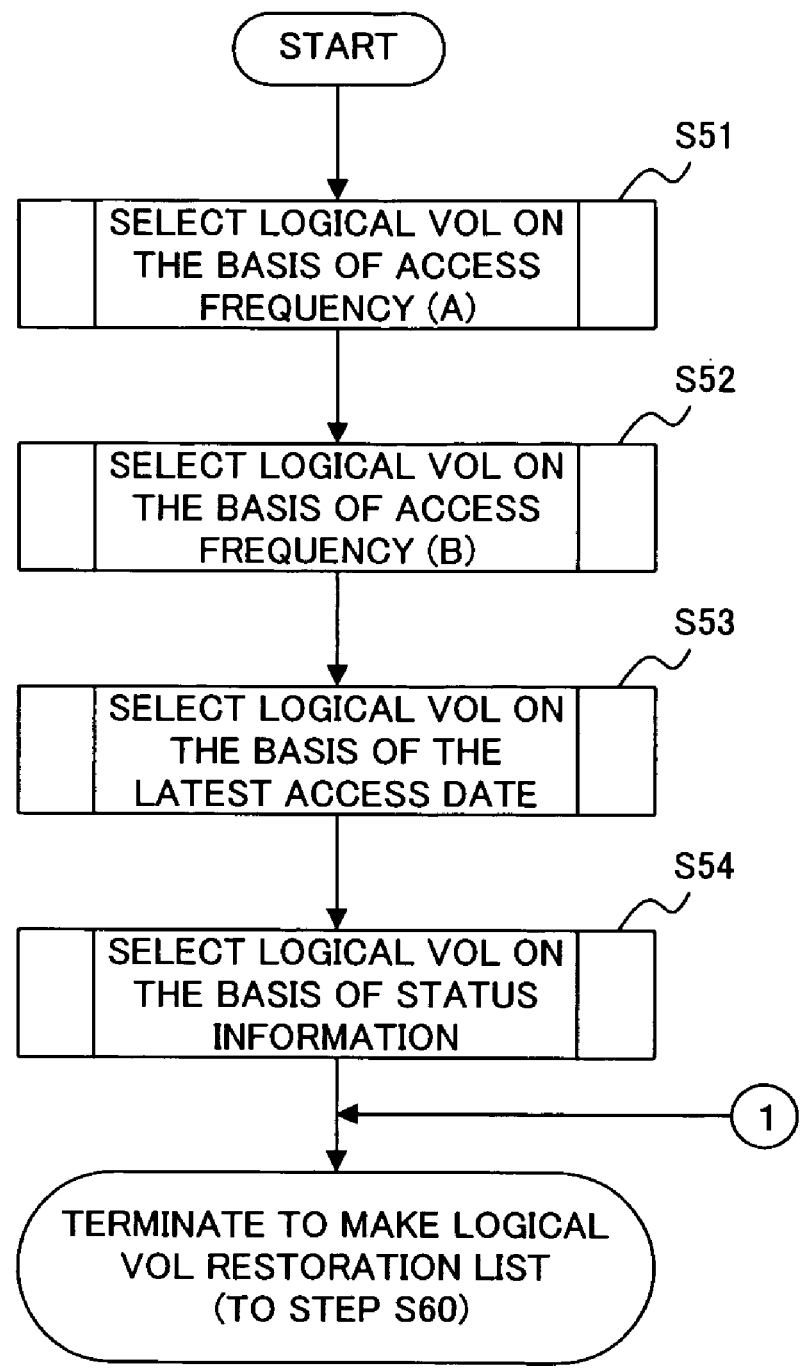
FIG. 4 is a flowchart for illustrating a procedure of selecting logical volumes to be restored in the cache restoring method according to the embodiment of this invention.

FIG. 4 is a flowchart (steps S51 through S54) for illustrating a procedure (details of step S50 in the above FIG. 3) of selecting logical volumes to be restored in the cache restoring method according to the embodiment of this invention. As shown in FIG. 4, the restoring means 57 determines the restoration priority of each logical volume on the basis of the access frequency (A) which is the number of times of access within the past one week [the above access state (a)] in the information (refer to FIG. 2) about the access states retained in the database 59, selects logical volumes to be restored onto the cache 58', and makes a logical volume restoration list (step S51).

Figure 5:
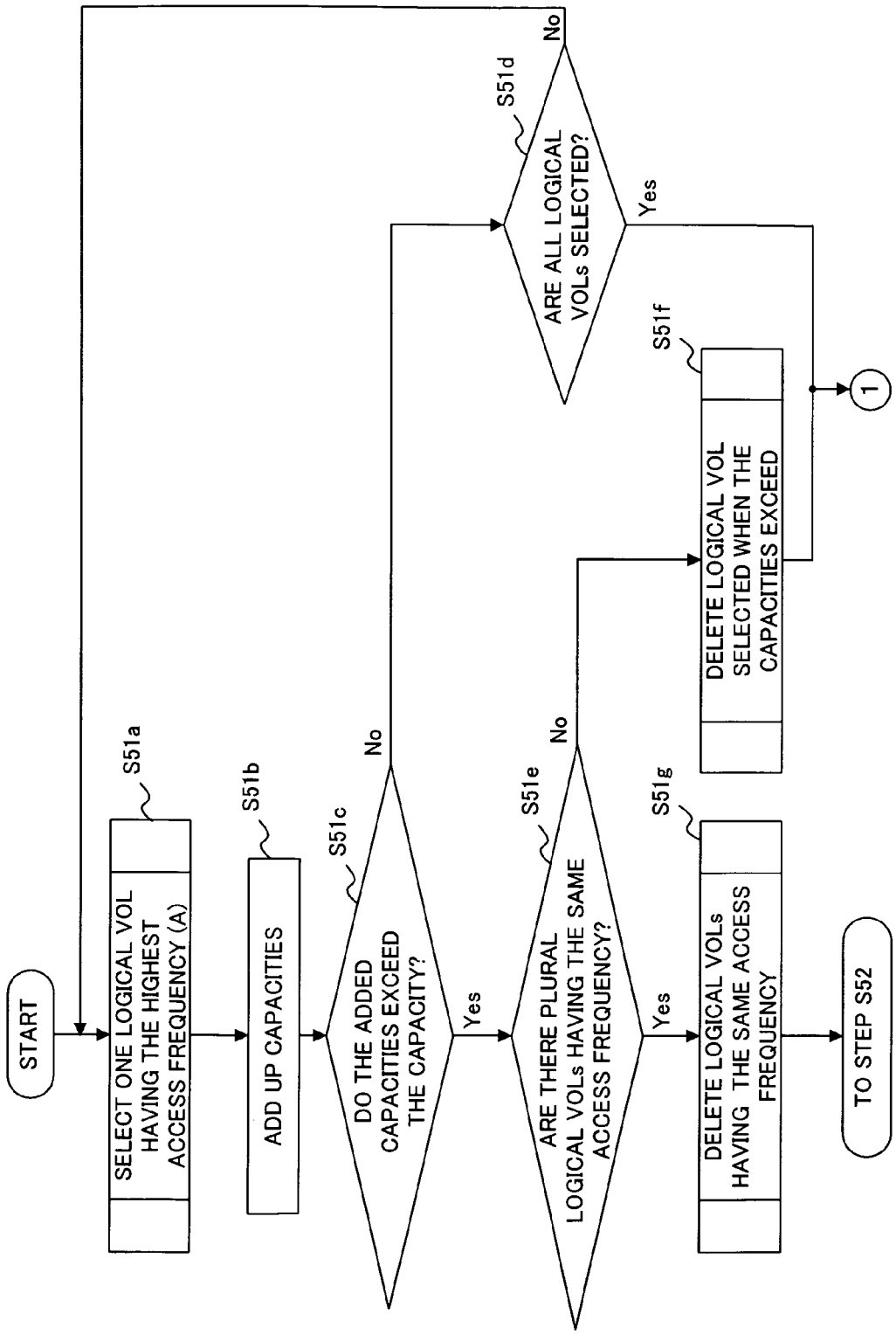
FIG. 5 is a flowchart for illustrating a procedure of selection on the basis of access frequency (A) shown in FIG. 4.

FIG. 5 is a flowchart (steps S51a through S51g) for illustrating a procedure of the process at step S51 shown in FIG. 4. As shown in FIG. 5, at step S51 (refer to FIG. 4), the restoring means 57 selects one logical volume having the highest access frequency (A) among logical volumes which are retained in the database 59 and can be selected (namely, which are unselected among logical volumes retained in the database 59), and adds the selected logical volume to the logical volume restoration list (step S51a). Namely, the restoring means 57 determines that the higher the access frequency (A), the higher the restoration priority of the logical volume is.

The restoring means 57 then adds up the capacities of all logical volumes entered in the logical volume restoration list (step S51b), and determines whether or not the added capacities exceed the capacity of the cache 58' (step S51c). The capacity of each of the selected logical volumes is used as the information in the database 59 collected and retained as the access state [the above access state (e)].

When determining at step S51c that the capacities do not exceed the capacity (No route at step S51c), the restoring means 57 determines whether or not all selectable logical volumes, that is, all logical volumes retained in the database 59 are selected (step S51d). When not selecting all the logical volumes (No route at step S51d), the restoring unit 57 returns to the process at step S51a.

At step S51, the processes at the above steps S51a and S51b are repeated until the added capacities exceed the capacity at step S51c (Yes route at step S51c) or all selectable logical volumes are selected (Yes route at step S51d), and logical volumes to be restored onto the cache 58' are selected in the order of the access frequency (A) and added to the logical volume restoration list.

When all the logical volumes are selected (Yes route at step S51d), the restoring means 57 terminates to make the logical volume restoration list, and proceeds to the process at step S60 (refer to FIGS. 3 to 5).

When determining that the added capacities exceed the capacity at step S51c (Yes route at step S51c), the restoring means 57 determines whether or not there are a plurality of logical volumes having the same access frequency (A) as the logical volume selected at step S51a this time among the logical volumes selected before (in the logical volume restoration list) (step S51e).

When there are not plural logical volumes having the same access frequency (A) (namely, when there is only the logical volume selected when the capacities exceed the capacity of the cache 58' this time; No route at step S51e), the restoring means 57 deletes only the logical volume selected when the capacities exceed (namely, the logical volume selected at step S51a this time) in the logical volume restoration list (step S51f), terminates to make the logical volume restoration list, and proceeds to the process at step S60 (refer to FIGS. 3 to 5).

When there are plural logical volumes having the same access frequency (A) (Yes route at step S51e), the restoring means 57 deletes all the logical volumes having the same access frequency (A) as the logical volume selected at step S51a this time among the logical volumes entered in the logical volume restoration list (step S51g), and proceeds to the process at step S52 (refer to FIG. 4) to be described later.

When the total amount of the logical volumes selected on the basis of the access frequency (A) exceed the capacity of the cache 58' at step S51g, logical volumes having the same access frequency (A) as the logical volume selected when the capacities exceed are removed from the group of logical volumes to be restored (from the logical volume list), whereby logical volumes to be restored within a limited capacity remaining on the cache 58' can be selected from a collection of logical volumes having the same access frequency (A) on a different reference (namely, selected at the following steps S52, S53 and S54).

As shown in FIG. 4, after the process at the step S51, the restoring means 57 determines the restoration priority of the logical volume on the basis of the access frequency (B) which is the number of times of access within the past one month [the above access state (b)] in the information about the access states (refer to FIG. 2), selects a logical volume to be restored, and makes a logical volume restoration list (step S52).

Figure 6:
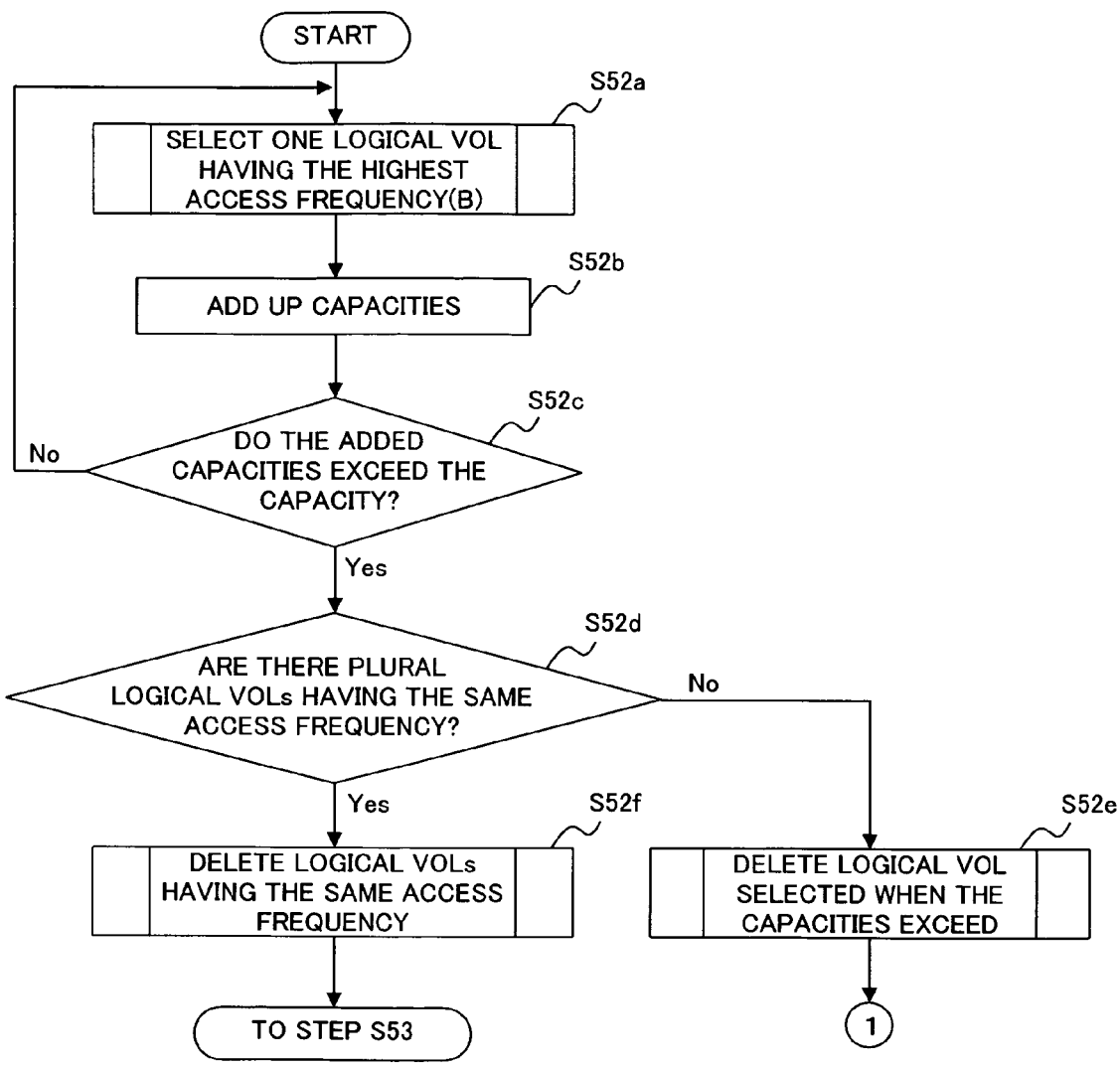
FIG. 6 is a flowchart for illustrating a procedure of selection on the basis of access frequency (B) shown in FIG. 4.

FIG. 6 is a flowchart (step S52a through S52f) for illustrating a procedure of the process at step S52 shown in FIG. 4. As shown in FIG. 6, at the above step S52 (refer to FIG. 4), the restoring means 57 selects one logical volume having the highest access frequency (B) among all the logical volumes having the same access frequency (A) as the logical volume selected when the capacities exceed the capacity of the cache 58' at the above step S51c (refer to FIG. 5), and adds the selected logical volume to the logical volume restoration list (step S52a). Namely, the restoring means 57 determines that the higher the access frequency (B), the higher the restoration priority is.

The restoring means 57 adds up the capacities of all logical volumes entered in the logical volume restoration list (step S52b), and determines whether or not the added capacities exceed the capacity of the cache 58' (step S52c).

When the capacities do not exceed the capacity of the cache 58' at step S52c (No route at step S52c), the restoring means 57 again selects a logical volume at step S52a. Namely, the restoring means 57 repeats the processes at the above steps S52a and S52b until determining that the capacities exceed the capacity of the cache 58' (until the procedure proceeds to the Yes route at step S52c), selects logical volumes to be restored onto the cache 58' in the order of the access frequency (B), and adds the selected logical volumes to the logical volume restoration list.

When the capacities exceed the capacity of the cache 58' at step S52c (Yes route at step S52c), the restoring means 57 determines whether or not there are a plurality of logical volumes having the same access frequency (B) as the logical volume selected at step S52a this time among the logical volumes selected before at the above step S52a (step S52d).

When there are not plural logical volumes having the same access frequency (B) among the logical volumes selected before at the above step S52a (namely, when there is only one logical volume selected when the capacities exceed the capacity of the cache 58' this time; No route at step S52d), the restoring means 57 deletes only the logical volume (namely, the logical volume selected at step S52a this time) selected when the capacities exceed the capacity of the cache 58' in the logical volume restoration list (step S52e), terminates to make the logical volume restoration list, and proceeds to the process at step S60 (refer to FIGS. 3, 4 and 6).

When there are a plurality of logical volumes having the same access frequency (B) (Yes route at step S52d), the restoring means 57 deletes all the logical volumes having the same access frequency (B) as the logical volume selected this time at step S52s and selected at the above step S52a among logical volumes entered in the logical volume restoration list (step S52f), and proceeds to the process at step S53 (refer to FIG. 4) to be described later.

At step S52f, a logical volume having the same access frequency (B) as the logical volume selected when the added capacities exceed the capacity of the cache 58' is deleted among logical volumes to be restored (in the logical volume restoration list) in the similar manner to the above step S51g (refer to FIG. 5), whereby a logical volume to be restored within the capacity remaining on the cache 58' can be selected from a collection of logical volumes having the same access frequency (B) on a different reference (namely, selected at the following steps S53 and S54).

As shown in FIG. 4, after the process at the above step S52, the restoring means 57 determines the restoration priority of a logical volume on the basis of the latest access date [above access state (c)] in the information about the access states (refer to FIG. 2), selects a logical volume to be restored onto the cache 58', and makes a logical volume restoration list (step S53).

Figure 7:
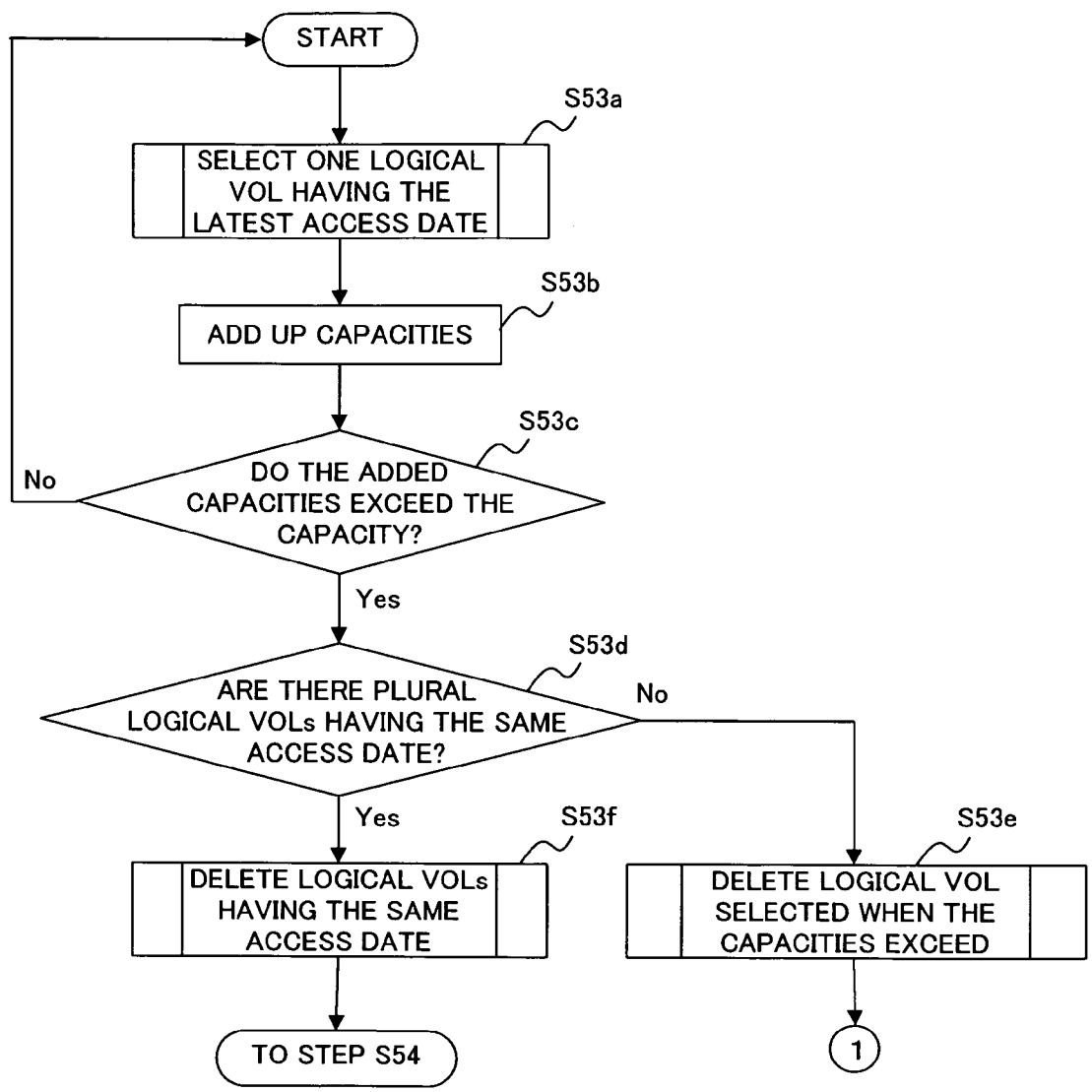
FIG. 7 is a flowchart for illustrating a procedure of selection on the basis of the latest access date shown in FIG. 4.

FIG. 7 is a flowchart (steps S53a through S53f) for illustrating a procedure of the process at step S53 shown in FIG. 4. As shown in FIG. 7, at the above step S53 (refer to FIG. 4), the restoring means 57 performs a process similar to the process at the above step S52 (refer to FIG. 6) excepting that the restoring means 57 performs the process on the basis of the access date, and selects a logical volume having the latest access date (step S53a). Steps S53a through S53f shown in FIG. 7 correspond to steps S52a through S52f shown in FIG. 6, respectively. Namely, the restoring means 57 determines that the later the access date of a logical volume, the higher the restoration priority thereof is.

As shown in FIG. 4, after the process at the above step S53, the restoring means 57 determines the restoration priority of a logical volume on the basis of the status information [the above access state (d)] in the information about the access states (refer to FIG. 2), and selects a logical volume to be restored onto the cache 58' (step S54).

Figure 8:
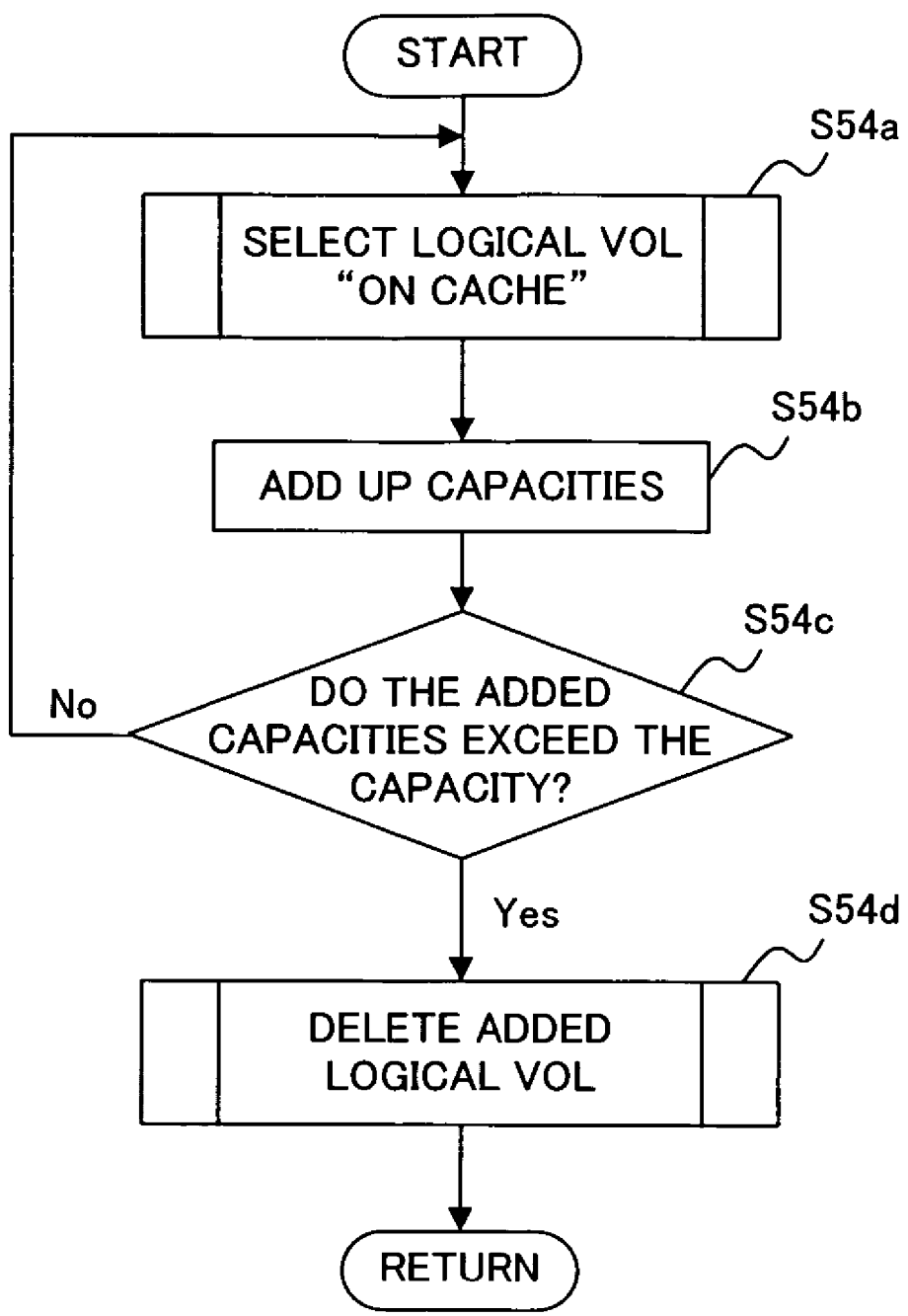
FIG. 8 is a flowchart for illustrating a procedure of selection on the basis of status information shown in FIG. 4.
Figure 9:
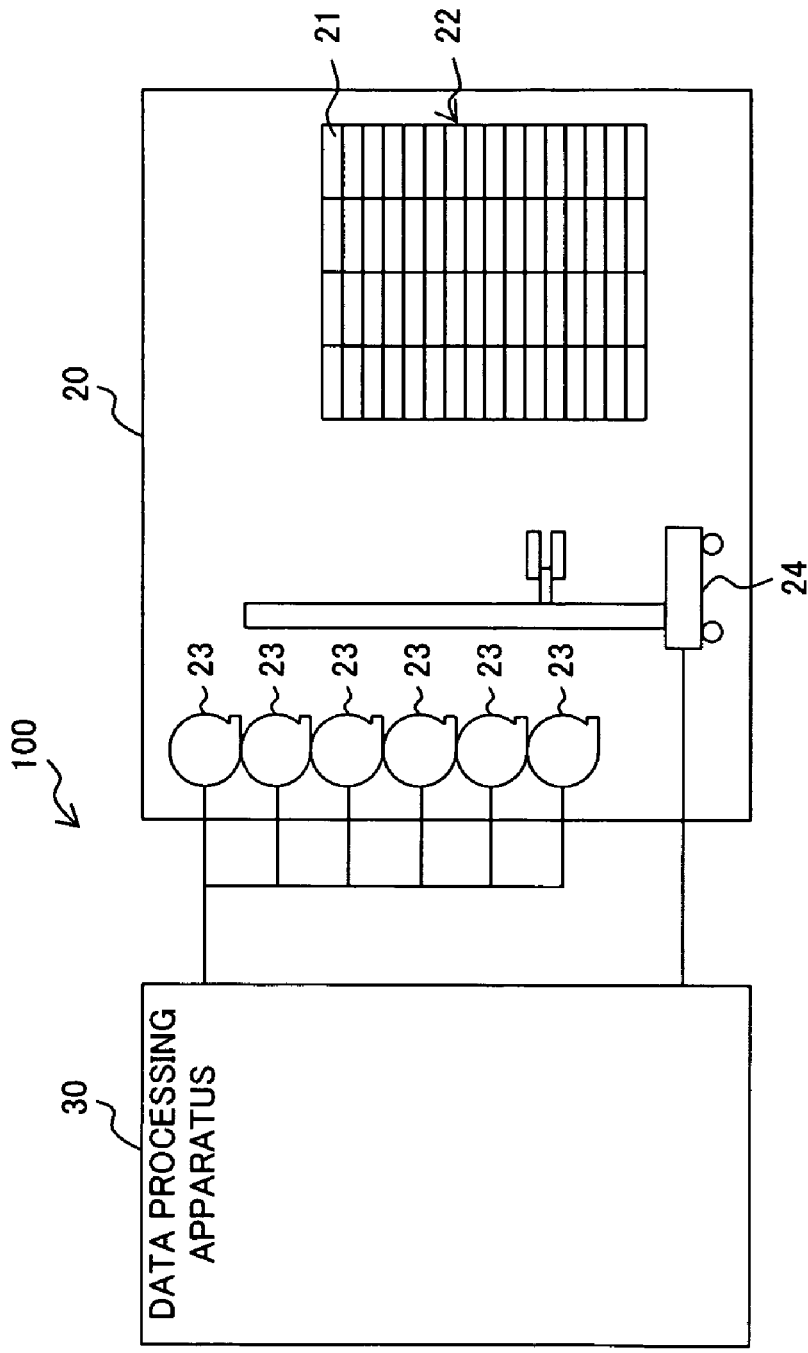
FIG. 9 is a schematic diagram showing a structure of a known library system.

FIG. 8 is a flowchart (steps S54a through S54d) for illustrating a procedure of the process at step S 54 shown in FIG. 4. As shown in FIG. 8, at the above step S54 (refer to FIG. 4), the restoring means 57 selects a logical volume in "On Cache" state on the basis of the status information, and adds the selected logical volume to the logical volume restoration list (step S54a). Namely, the restoring means 57 determines that a logical volume in "On Cache" state as being the status information has a higher restoration priority.

Next, the restoring means 57 adds up the capacities of all logical volumes entered in the logical volume restoration list (step S54b), and determines whether or not the added capacities exceed the capacity of the cache 58' (step S54c).

When the capacities do not exceed the capacity of the cache 58' (No route at step S54c), the restoring means 57 again select a logical volume at step S54a. Namely, the restoring means 57 repeats the processes at the above steps S54a and S54b until determining that the capacities exceed the capacity of the cache 58' at step S54c (Yes route at step S54c) to select a logical volume to be restored onto the cache 58'.

When the capacities exceed the capacity of the cache 58' at step S54c (Yes route at step S54c), the restoring means 57 deletes the logical volume selected at the above step S54a when the capacities exceed the capacity of the cache 58' this time in the logical volume restoration list (step S54d), and terminates the process.

As shown in FIG. 4, after the process at the above step S54, the restoring means 57 terminates to make the logical volume restoration list, and proceeds to the process at step S60 (refer to FIG. 3).

According to the library system 10 and the cache restoring method according to the embodiment of this invention, when the cache 58 of the virtual library apparatus 50 is replaced with a new cache 58' due to, for example, a fault or a change in the capacity, the restoring means 57 determines the restoration priority of each logical volume on the basis of the access states collected by the collecting means 55 and retained in the databases 56 and 59, and restores the logical volume onto the newly replaced cache 58' according to the restoration priority. It is thus possible to certainly prevent the response speed to a process request (request to mount a logical volume) from the data processing apparatus 30 occurring immediately after the replacement of the cache from being slower than the response speed obtained during the normal operation before the replacement of the cache.

The restoring means 57 restores logical volumes onto the cache 58' in the order of the access frequency as being the access state [the above access frequency (A) or (B)] so that a logical volume having a higher chance to be used is certainly restored. It is thus possible to certainly avoid a situation that the response speed becomes slower than the case where logical volumes held in the cache 58 before the replacement of the cache are simply restored onto the new cache 58', and certainly keep the response speed obtained during the normal operation before the replacement of the cache.

In the cache 58 of the virtual library apparatus 50, it is general, during the normal operation, that a logical volume having a larger volume is deleted irrespective of the access frequency and the like when a capacity of a new logical volume cannot secured on the cache at the time that the new logical volume is added in order to retain a larger number of logical volumes within a limited capacity. Accordingly, if logical volumes held in the cache 58 before the replacement are simply restored onto the new cache 58' when the cache 58 is replaced with the new cache 58', a higher response speed cannot be always secured. For this, the restoring means 57 restores logical volumes having higher access frequency in order onto the cache 58', whereby the response speed can be certainly kept rather than the case where the logical volumes held in the cache 58 before the replacement are simply restored onto the new cache 58'.

The restoring means 57 first restores logical volumes onto the cache 58' on the basis of the access frequency (A). When there is not a sufficient capacity on the cache 58' to restore all the logical volumes having the same access frequency (A), the restoring means 57 restores logical volumes onto the cache 58' in the order of the access frequency (B). It is thus possible to restore logical volumes onto the cache 58' on the basis of the access frequency more certainly, and keep the response speed more certainly.

When there is not a sufficient capacity on the cache 58' to restore all the logical volumes having the same access frequency, the restoring means 57 restores logical volumes in the order of the latest access date. It is thus possible to restore logical volumes according to the access state before the replacement of the cache, and keep the response speed more certainly.

When there is not a sufficient capacity on the cache 58' to restore all the logical volumes having the same latest access date, the restoring means 57 restores logical volumes held in the cache before the replacement in the order of the status information (namely, logical volumes in "On Cache" status). It is thus possible to restore logical volumes according to the access state before the replacement, and keep the response speed more certainly.

Since the restoring means 57 first restores logical volumes in the order of the access frequency, it is possible to keep the response speed more certainly even when the capacity of the cache 58' newly replaced differs from the capacity of the cache 58 before the replacement.

[2] Modification of the Invention

Note that the present invention is not limited to the above example, but may be modified in various ways without departing from the scope of the invention.

In the above embodiment, the databases (namely, the databases 56 and 59), in which information about the access states collected by the collecting means 55 is retained, are provided in the control unit 54 and the cache 58 of the virtual library apparatus 50. However, the present invention is not limited to this example. The databases may be provided in the data processing apparatus 30 or the library apparatus 20 (for example, the physical volumes 21). Alternatively, the databases are not held in the library system 10, but an operator, CE (Customer Engineer) or the like who maintains and manages the library system 10, for example, may save data relating the access states collected by the collecting means 55 and accumulated in the library system 10, and retain the saved data as a database in an external terminal.

In the above embodiment, the collecting means 55 and the restoring means 57 are provided in the control unit 54 of the virtual library system 50. However, the present invention is not limited to this example. The collecting means 55 and the restoring means 57 may be provided in the data processing apparatus 30. Further, the restoring means 57 may be provided in a terminal differing from the library system 10, not in the library system 10, and an operator who replaces the cache may connect the terminal to the virtual library apparatus 50 when replacing the cache 58 of the virtual library apparatus 50 to restore logical volumes onto the cache 58'.

In the above embodiment, the collecting means 55 collects the above two kinds of access frequency (A) and (B) (refer to FIG. 2) as the access states. However, the present invention is not limited to this example. The collecting means 55 may collect the number of times of access within a period differing from the periods used for the two kinds of access frequency (A) and (B). In which case, the restoring means 57 may use two or more kinds of access frequency.

In the above embodiment, the collecting means 55 collects the latest access date as the access state. However, the present invention is not limited to this example. The collecting means 55 may collect the latest access date and time.

In the above embodiment, in making a logical volume restoration list (steps S51 through S54), when there is not a logical volume having the same access state as a logical volume selected (entered) when the capacities of logical volumes entered in the logical volume restoration list exceed the capacity of the cache 58' in the logical volume restoration list (namely, No route at step S51e in FIG. 5, No route at step S52d in FIG. 6 and No route at step S53d in FIG. 7), the restoring means 57 deletes the logical volume selected when the capacities exceed the capacity of the cache 58' in the logical volume restoration list, and terminates to make the logical volume restoration list. However, the present invention is not limited to this example. After deleting the logical volume selected when the capacities exceed the capacity of the cache 58' in the logical volume restoration list, the restoring means 57 may again select a logical volume to be restored onto the cache 58' on the basis of another access state in order to efficiently use the capacity remaining on the cache 58'.

[3] Others

Functions as being the collecting means 55 and the restoring means 57 are realized by executing a predetermined application program (cache restoring program) by a computer (including CPU, information processing apparatus, various terminals, etc.).

The program is provided in a form in which the program is recorded on a computer readable recording medium such as a flexible disk, CD-ROM, CD-R, CD-RW, DVD or the like. In this case, the computer reads the cache restoring program from the recording medium, transfers the program to the internal storage or an external storage, and stores the program therein to use the same. Alternatively, the program may be recorded on a storage (recording medium) such as a magnetic disk, optical disk, magneto-optic disk or the like, and provided to the computer from the storage over a communication line.

Here, the computer is a concept including hardware and an OS (operating system), signifying hardware operating under the control of the OS. When the OS is unnecessary and the application program solely operates the hardware, the hardware itself corresponds to the computer. The hardware has at least a microprocessor such as a CPU or the like, and a part for reading the computer program recorded on the recording medium. The application program as being the above cache restoring program includes program codes for realizing the functions as being the collecting means 55 and the restoring means 57. A part of the functions may be realized by not the application program but the OS.

As the recording medium according to this embodiment, usable are various computer readable media such as an IC card, ROM cartridge, magnetic tape, punched card, internal storage (memory such as RAM, ROM or the like) of the computer, external storage, printed matter on which codes such as bar codes or the like are printed, etc., other than the above flexible disk, CD-ROM, CD-R, CD-RW, DVD, magnetic disk, optical disk, magneto-optic disk.

What is claimed is:

1. A library system comprising:
   a library apparatus storing therein a recording medium as a physical volume, and having a drive unit for accessing to said physical volume;
   a data processing apparatus processing data recorded on said physical volume in said library apparatus; and
   a virtual library apparatus interposed between said library apparatus and said data processing apparatus;
   said virtual library apparatus comprising:
      a cache holding data read out from said physical volume as a logical volume in order that said data processing apparatus has an access to the data to process the data;
      a logical drive accessing to said logical volume held in said cache according to an instruction of access for said physical volume in said library apparatus from said data processing apparatus; and
      a physical layer recording data recorded on said cache as said logical volume by said logical drive on a physical volume in said library apparatus asynchronously with an access to said logical volume by said logical drive;

said library system comprising:
- a collecting means for collecting an access state to said logical volume from said data processing apparatus;
- a database for retaining said access state collected by said collecting means; and
- a restoring means determining a restoration priority of said logical volume on the basis of said access state retained in said database, reading out said logical volume from a physical volume retaining said logical volume onto said cache according to said restoration priority, thereby restoring said logical volume to be held in said cache.

2. The library system according to claim 1, wherein said collecting means collects access frequency to each of logical volumes from said data processing apparatus as said access state, and retains said access frequency in said database; and
- said restoring means determines said restoration priority on the basis of said access frequency retained in said database.

3. The library system according to claim 2, wherein said collecting means collects two or more kinds of access frequency having different periods of time as said access frequency, and retains said two or more kinds of access frequency in said database; and
- said restoring means determines said restoration priority on the basis of said two or more kinds of access frequency retained in said database.

4. The library system according to claim 1, wherein said collecting means collects the latest access date and time to each of logical volumes as said access state, and retains said latest access date and time in said database; and
- said restoring means determines said restoration priority on the basis of said latest access date and time retained in said database.

5. The library system according to claim 1, wherein said collecting means collects status information on each of logical volumes as said access state, and retains said status information in said database; and
- said restoring means determines said restoration priority on the basis of said status information retained in said database.

6. The library system according to claim 1, wherein said collecting means collects a capacity of each of logical volumes as said access state, and retains said capacity in said database; and
- said restoring means calculates added capacities of restored logical volumes on the basis of said capacity retained in said database, and changes a determination reference for said restoration priority when said added capacities exceed a capacity of said cache.

7. The library system according to claim 1, wherein said collecting means, said database and said restoring means are provided in said virtual library apparatus.

8. The library system according to claim 1, wherein said collecting means, said database and said restoring means are provided in said data processing apparatus.

9. The library system according to claim 1, wherein said collecting means, said database and said restoring means are provided in said library apparatus.

10. The library system according to claim 1, wherein said cache is a RAID (Redundant Arrays of Inexpensive Disk).

11. A virtual library apparatus interposed between a library apparatus storing therein a recording medium as a physical volume and having a drive unit for accessing to said physical volume and a data processing apparatus processing data recorded on said physical volume in said library apparatus, said virtual library apparatus comprising:
- a cache holding data read out from said physical volume as a logical volume in order that the data processing apparatus has an access to the data to process said data;
- a logical drive accessing to said logical volume held in said cache according to an instruction from said data processing apparatus; and
- a physical layer recording data recorded on said logical volume by said logical drive on a physical volume retaining said logical volume asynchronously with an access to said logical volume by said logical drive, said virtual library apparatus comprising:
- a collecting means for collecting an access state to said logical volume from said data processing apparatus;
- a database for retaining said access state collected by said collecting means; and
- a restoring means determining a restoration priority of said logical volume on the basis of said access state retained in said database, reading out said logical volume from a physical volume retaining said logical volume onto said cache according to said restoration priority, thereby restoring said logical volume to be held in said cache.

12. The virtual library apparatus according to claim 11, wherein said collecting means collects access frequency to each of logical volumes from said data processing apparatus as said access state, and retains said access frequency in said database; and
- said restoring means determines said restoration priority on the basis of said access frequency retained in said database.

13. The virtual library apparatus according to claim 12, wherein said collecting means collects two or more kinds of access frequency having different periods of time as said access frequency, and retains said two or more kinds of access frequency in said database; and
- said restoring means determines said restoration priority on the basis of said two or more kinds of access frequency retained in said database.

14. The virtual library apparatus according to claim 11, wherein said collecting means collects the latest access date and time to each of logical volumes as said access state, and retains said latest access date and time in said database; and
- said restoring means determines said restoration priority on the basis of said latest access date and time retained in said database.

15. The virtual library apparatus according to claim 11, wherein said collecting means collects status information on each of logical volumes as said access state, and retains said status information in said database; and
- said restoring means determines said restoration priority on the basis of said status information retained in said database.

16. The virtual library apparatus according to claim 11, wherein said collecting means collects a capacity of each of logical volumes as said access state, and retains said capacity in said database; and
- said restoring means calculates added capacities of restored logical volumes on the basis of said capacity retained in said database, and changes a determination reference for said restoration priority when said added capacities exceed a capacity of said cache.

17. The virtual library apparatus according to claim 11, wherein said cache is a RAID (Redundant Arrays of Inexpensive Disk).

18. A cache restoring method used in a virtual library apparatus interposed between a library apparatus storing therein a recording medium as a physical volume and having a drive unit for accessing to said physical volume and a data processing apparatus processing data recorded on said physical volume in said library apparatus, said virtual library apparatus comprising:

a cache holding data read out from said physical volume in said library apparatus as a logical volume in order that the data processing apparatus has an access to the data to process said data;

a logical drive accessing to said logical volume held in said cache according to an instruction of access for said physical volume in said library apparatus from said data processing apparatus; and a physical layer recording data recorded on said cache as said logical volume by said logical drive on a physical volume in said library apparatus asynchronously with an access to said logical volume by said logical drive, said method comprising:

collecting an access state to said logical volume from said data processing apparatus, and retaining said access state in a database; and determining a restoration priority of said logical volume on the basis of said access state retained in said database, reading out said logical volume from a physical volume retaining said logical volume onto said cache according to said restoration priority, thereby restoring said logical volume to be held in said cache.

19. The cache restoring method according to claim 18, wherein, at said collecting and retaining step, access frequency to each of logical volumes from said data processing apparatus is collected as said access state, and retained in said database; and at said restoring step, said restoration priority is determined on the basis of said access frequency retained in said database.

20. The cache restoring method according to claim 19, wherein, at said collecting and retaining step, two or more kinds of access frequency having different periods of time are collected as said access frequency, and retained in said database; and at said restoring step, said restoration priority is determined on the basis of said two or more kinds of access frequency retained in said database.

21. The cache restoring method according to claim 18, wherein, at said collecting and retaining step, the latest access date and time to each of logical volumes is collected as said access state, and retained in said database; and at said restoring step, said restoration priority is determined on the basis of said latest access date and time retained in said database.

22. The cache restoring method according to claim 18, wherein, at said collecting and retaining step, status information about each of logical volumes is collected as said access state, and retained in said database; and at said restoring step, said restoration priority is determined on the basis of said status information retained in said database.

23. The cache restoring method according to claim 18, wherein, at said collecting and retaining step, a capacity of each of logical volumes is collected as said access state, and retained in said database; and at said restoring step, added capacities of restored logical volumes are calculated on the basis of said capacity retained in said database, and a determination reference for said restoration priority is changed when said added capacities exceed a capacity of said cache.

24. A computer readable recording medium recorded thereon a cache restoring program for making a computer realize a function of restoring contents of a cache in a virtual library apparatus interposed between a library apparatus storing therein a recording medium as a physical volume and having a drive unit for accessing to said physical volume and a data processing apparatus processing data recorded on said physical volume in said library apparatus, said virtual library apparatus comprising:

said cache holding data read out from said physical volume in said library apparatus as a logical volume in order that the data processing apparatus has an access to the data to process said data;

a logical drive accessing to said logical volume held in said cache according to an instruction from said data processing apparatus; and a physical layer recording data recorded on said logical volume by said logical drive on a physical volume retaining said logical volume asynchronously with an access to said logical volume by said logical drive, said cache restoring program making said computer function as:

a collecting means for collecting an access state to said logical volume from said data processing apparatus, and retaining said access state in said database; and a restoring means determining a restoration priority of said logical volume on the basis of said access state retained in said database, reading out said logical volume from a physical volume retaining said logical volume onto said cache according to said restoration priority, thereby restoring said logical volume to be held in said cache.

* * * * *